United States Patent [19]

Suzuki

[11] Patent Number: 5,467,129
[45] Date of Patent: Nov. 14, 1995

[54] CAMERA WITH AUTOMATIC DATA COMPRESSION FACTOR SELECTION

[75] Inventor: Masahiro Suzuki, Kawasaki, Japan

[73] Assignee: Nikon Corporation, Tokyo, Japan

[21] Appl. No.: 157,416

[22] Filed: Nov. 26, 1993

[30] Foreign Application Priority Data

Nov. 25, 1992 [JP] Japan .................... 4-315356

[51] Int. Cl.⁶ ............................................. H04N 5/76
[52] U.S. Cl. ........................................ 348/231; 348/384
[58] Field of Search .................... 348/222, 230, 348/231, 232, 233, 234, 235, 236, 391, 393, 396, 397, 399, 400, 403, 404, 405, 406, 407, 408, 410, 411, 412, 413, 419; H04N 5/91, 5/92, 5/232, 5/235

[56] References Cited

U.S. PATENT DOCUMENTS

| | | | |
|---|---|---|---|
| 3,006,991 | 10/1961 | Cherry et al. | 348/199 |
| 4,707,738 | 11/1987 | Ferre et al. | 348/400 |
| 4,851,906 | 7/1989 | Koga et al. | 348/413 |
| 5,206,730 | 4/1993 | Sakai | 348/231 |
| 5,235,421 | 8/1993 | Yang | 348/398 |
| 5,249,053 | 9/1993 | Jain | 348/231 |
| 5,293,236 | 3/1994 | Adachi et al. | 348/231 |
| 5,295,077 | 3/1994 | Fukuoka | 348/231 |

FOREIGN PATENT DOCUMENTS

| | | | |
|---|---|---|---|
| 0390421 | 10/1990 | European Pat. Off. . | |
| 0257780 | 10/1990 | Japan | H04N 5/91 |

OTHER PUBLICATIONS

Patent Abstracts of Japan, vol. 13, No. 192 (E–745) May 9, 1989 & JP-A-01 013 817 (NEC Corp.), Jan. 18, 1989.

*Primary Examiner*—James J. Groody
*Assistant Examiner*—Michael H. Lee

[57] ABSTRACT

Image processing system for a camera which automatically selects a data compression factor. The system converts an image of a photographic subject into digital data, compresses the digital data and stores it on a recording medium. An imaging unit first converts light from a photographic subject into analog image signals which are processed by a signal processing unit, A/D converted and temporarily stored in a buffer memory. A data compression factor is automatically selected for data compression processing based upon components of signals extracted from analog image data output from the signal processing unit. Data compression processing is then performed at high speed on the image data stored in the buffer memory according to the selected compression factor.

19 Claims, 3 Drawing Sheets

CAMERA WITH AUTOMATIC DATA COMPRESSION FACTOR SELECTION

BACKGROUND OF THE INVENTION

1. Field of the Invention

The present invention relates to camera in which the image of a photographic subject is converted into digital data, and the data is compressed and stored on a recording medium. More particularly, the present invention relates to a still camera which automatically selects a data compression factor for data compression processing.

2. Description of the Related Art

Still cameras are know which record the image of a subject in memory as digital image data. For example, FIG. 3 is a block diagram illustrating an example of a prior art imaging system for a still camera which records the image of a subject in memory as digital data. According to the system shown in FIG. 3, an imaging action is begun in response to the half-depression of a release button (not shown). Light from a photographic subject enters a lens 50 and is imaged on an imaging unit 54. The amount of light imaged on the imaging unit 54 is controlled by an electronic shutter (not shown) and a stop 52. The imaging unit 54 photoelectrically converts the light from the photographic subject into analog electrical signals by a built-in charge coupled device (CCD), or similar device. A signal processing unit 56 receives the photoelectrically converted output of the imaging unit 54 and performs white balance correction, amplification, γ correction and like processing on the received signals to produce an image signal. The image signal output from the signal processing unit 56 is converted into a digital image signal by an analog-to-digital (A/D) converter 58, and the output of the A/D converter 58 is temporarily stored in a buffer memory 60. The image signal data stored in the buffer memory 60 is sent to a data compression unit 62 when the release button is fully depressed. The data compression unit 62 performs well-known data compression processing on the image data, and, finally, the compressed image data is stored in memory on a memory card 64. A control unit 66 is also provided which controls each of the above-described circuits.

The prior art imaging system shown in FIG. 3 may operate in two modes: a manual compression mode, and an auto compression mode. The mode of data compression by the data compression unit 62 can be selected by the photographer, and data compression is performed according to the selected data compression mode. When operating in the manual compression mode the photographer may select a data compression factor. However, when performing imaging in the auto compression mode, the action of the data compression unit 62 is carried out according to the properties of the digital image data stored in the buffer memory 60, or by extracting a portion of image data, and from the data length at this time, the camera selects an appropriate compression factor, and data compression is performed according to the selected compression factor.

A system for automatically selecting a compression factor is known. For example, Japanese Laid-Open Patent Publication 2-257780 discloses various methods for performing data compression of digital image data. According to one method disclosed, data compression is performed at a suitable data compression ratio such that the smallest amount of data remains after compression. According to another method disclosed, the compression factor is selected such that a fixed amount of data remains after compression.

However, in the prior art imaging system for a video still camera described above, when a photographer has selected the auto compression mode, compression factor selection is performed by actually performing data compression processing for the digital image data until arriving at the selection of a compression factor. The data compression process, therefore, has to be performed a number of times to select a compression factor, and, as a result, the process is lengthy. Therefore, the time interval from the commencement of the photographic action until the storage on the memory card 64 is long. This time interval is a primary factor preventing the speeding up of continuous photography. Furthermore, a large amount of digital data is necessary for appropriate compression factor selection. The amount of data required for appropriate compression lengthens the time necessary for selecting a compression factor. Further, since, according to the prior art, the data compression unit 62 performs data compression until a compression factor is selected, electrical power is wasted.

SUMMARY OF THE INVENTION

Therefore, it is an object of the present invention to provide an image processing system for a camera which performs selection of a data compression factor at a high speed.

It is a further object of the present invention to provide an image processing system for a camera which performs selection of a data compression factor with low electric power consumption and at a high speed.

It is yet a further object of the present invention to provide an image processing system for a camera which automatically selects a compression factor for data compression.

It is another object of the present invention to provide an image processing system for a camera which automatically selects a compression factor and performs the selection of the compression factor with low electric power consumption and at a high speed.

Additional objects and advantages of the invention will be set forth in part in the description which follows, and, in part, will be obvious from the description, or may be learned by practice of the invention.

The foregoing objects of the present invention are achieved by providing a camera which includes an imaging unit which receives light from a photographic subject via a lens and a stop, and which photoelectrically converts the light from the photographic subject into analog electrical image signals. A signal processing unit receives the analog image signals and performs γ correction and like processing of the received signals. The analog image signals are then A/D converted and stored temporarily in a buffer memory. A frequency component extraction unit extracts the frequency components of the analog image signals output by the signal processing unit. The extracted frequency components may be the high frequency components of the brightness signals from the signal processing unit, or other components of the analog image signal. A compression factor selection unit selects a compression factor for performing data compression based upon the extracted frequency components. After the compression factor has been selected, data compression processing is performed on the A/D converted image signals which have been temporarily stored in the buffer memory. The compressed image data is then stored in a recording medium.

The above objects of the present invention may also be achieved with an image processing system having a signal processing unit which outputs analog image signals which are color analyzed into component signals of the three primary colors, red, green and blue. The frequency component extraction unit extracts the frequency components of the green component signal of the analog image signals in order to select a compression factor.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
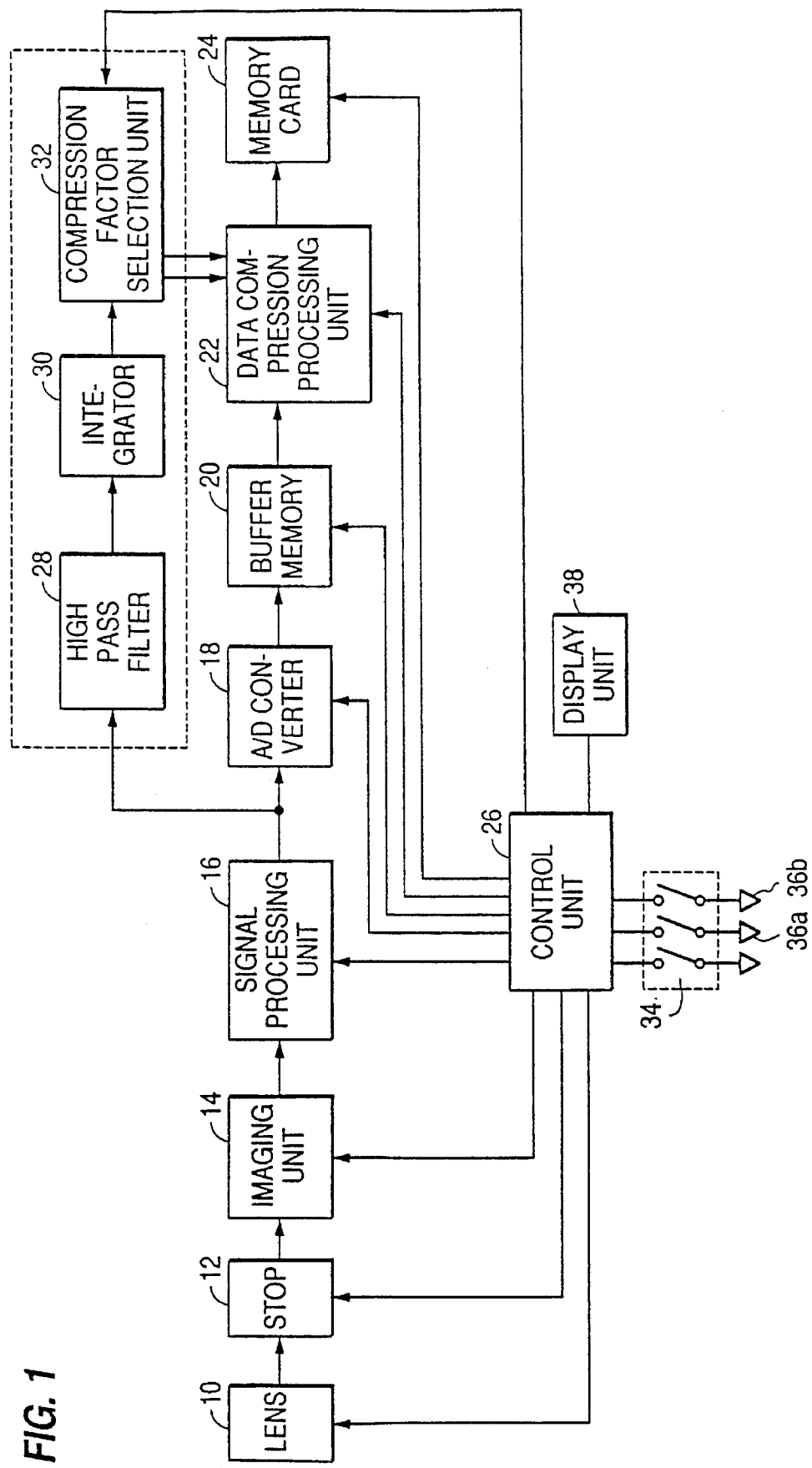
FIG. 1 is a block diagram of an image processing system in a camera in accordance with a preferred embodiment of the present invention.

Reference will now be made in detail to the preferred embodiments of the present invention, examples of which are illustrated in the accompanying drawings. Like reference numerals refer to like elements throughout.

FIG. 1 is a block diagram illustrating an image processing system for processing image data in a camera in accordance with a preferred embodiment of the present invention. The present invention is applicable to video still cameras, movie cameras, television cameras and like types of cameras. The image processing system includes: a lens 10; a stop 12; an imaging unit 14 which images light from a photographic subject; a signal processing unit 16 which performs γ correction and like signal processing; an A/D converter 18; a buffer memory 20 which temporarily stores image data; a data compression processing unit 22; a memory card 24 on which image data is recorded; and a control unit 26 equipped with a microprocessor, CPU or similar control circuitry which performs control of each of the circuits within the image processing system.

The imaging unit 14 includes a CCD and like imaging elements, and an electronic shutter. Light from a subject imaged on the imaging elements is converted, at predetermined intervals, into electrical signals, and image plane (frame) units of analog image data are output. The memory card 24 may be a semiconductor memory, a magnetic tape, magnetic disk, or other similar type of recording medium.

The image processing system also includes a high pass filter 28, an integrator 30, and a compression factor selection unit 32. According to the preferred embodiment, the high pass filter 28 receives only the brightness signals from the analog image data which are output from the signal processing unit 16. The high pass filter 28 passes only those brightness signals having frequency components at or above a constant K frequency (for example, 4 MHz).

The integrator 30 integrates the output signals from the high pass filter 28 for each image plane during predetermined intervals based upon instructions from the control unit 26, and the integrator 30 outputs a result which is a voltage value.

The compression factor selection unit 32 receives the voltage value output frown integrator 30 and outputs a signal, based upon the voltage value output from the integrator 30, for use in data compression factor selection in the data compression processing unit 22.

The data compression processing unit 22 may be set to an auto compression mode or a manual compression mode by a changeover switch 34. When the changeover switch 34 is set to the auto compression mode, the data compression processing unit performs data compression based upon the state of two input ports $P_1$ and $P_0$ (described below with respect to FIG. 2). When the changeover switch 34 is set to the manual compression mode, data compression is performed according to a compression factor set by compression factor selection switches 36a and 36b. The selected compression factor is displayed by the display unit 38.

Figure 2:
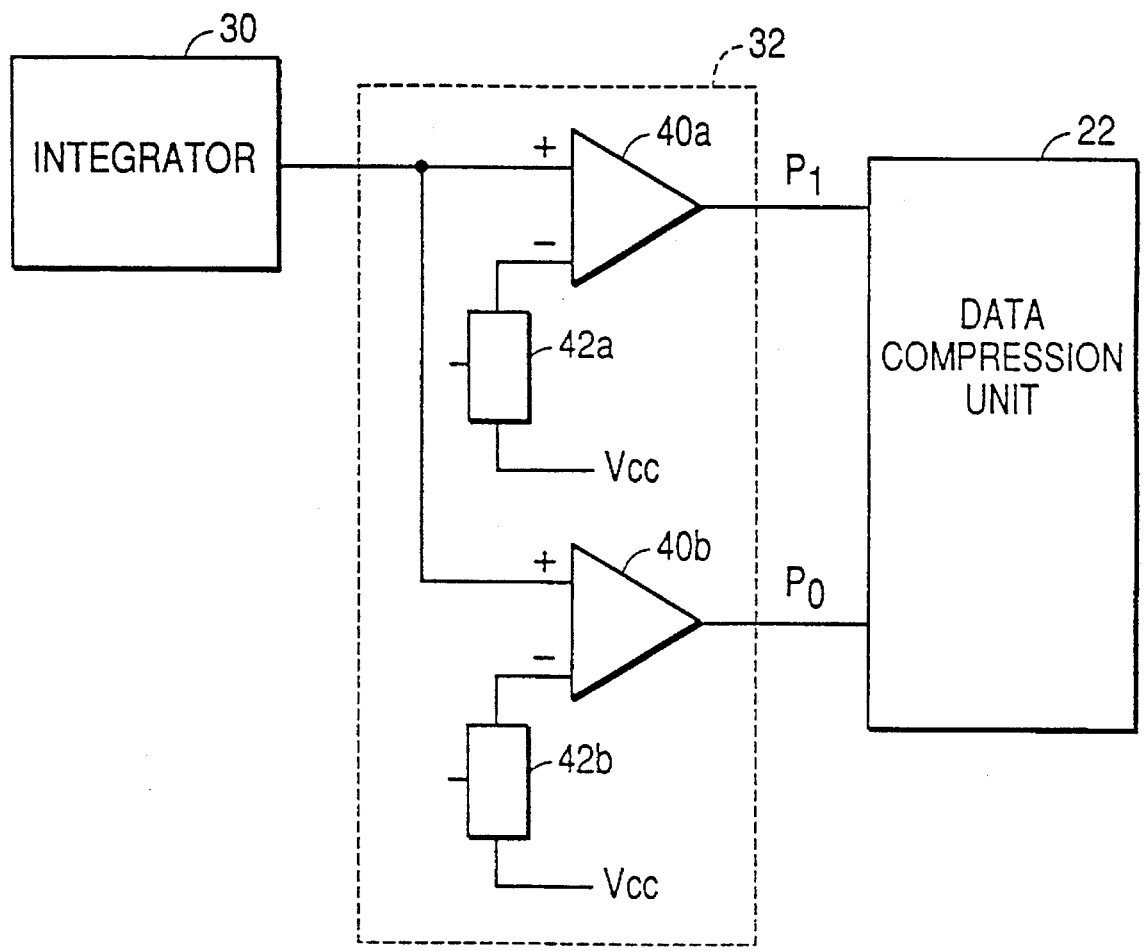
FIG. 2 is a block diagram showing a circuit for performing compression factor selection in accordance with the preferred embodiment of the present invention.
Figure 3:
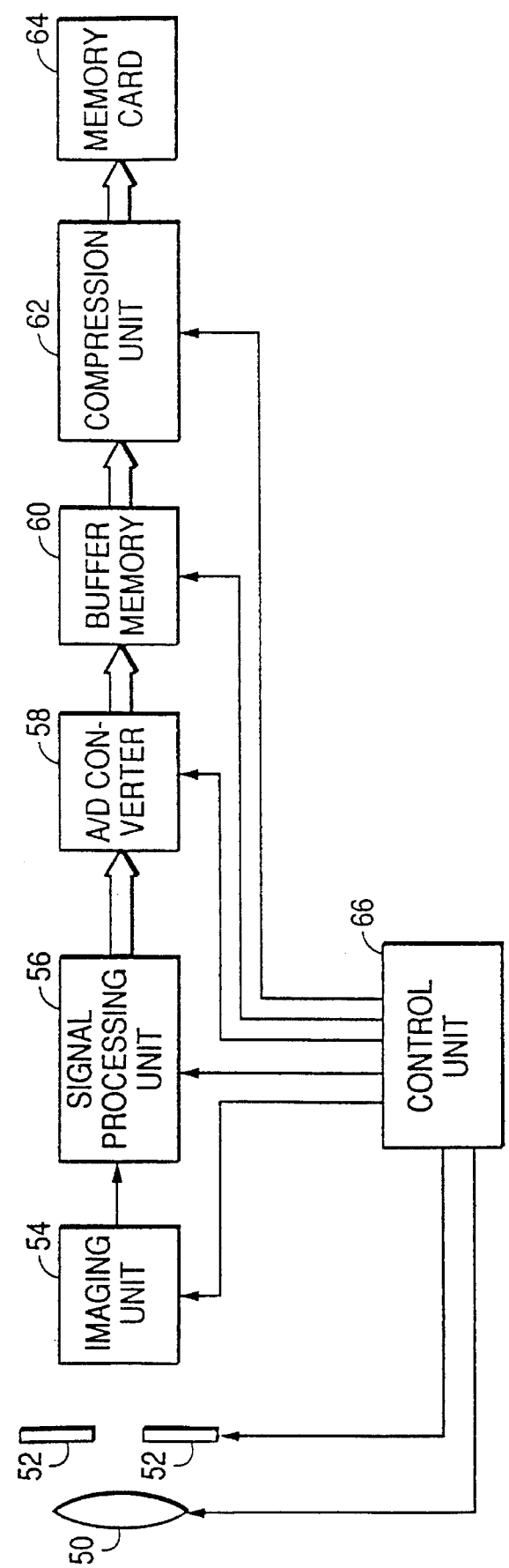
FIG. 3 is a block diagram showing prior art still camera circuitry for digitally storing an image.

As seen in FIG. 2, the compression factor selection unit 32 includes two comparators 40a and 40b, and two standard voltage generators 42a and 42b. The standard voltage generators 42a and 42b generate standard voltages A(V) and B(V), respectively, where A<B, from the standard voltage $V_{CC}$ of the camera. The inputs to the comparator 40a are the added output voltage $V_Y$ of the integrator 30 and the subtracted standard voltage A(V) from the standard voltage generator 42a. Similarly, the inputs to the comparator 40b are the added output voltage $V_Y$ of the integrator 30 and the subtracted standard voltage B(V) from the standard voltage generator 42b. The outputs from the comparators 40a and 40b are input to the input ports $P_1$ and $P_0$, respectively, of the data compression processing unit 22.

As described above, a camera equipped with the image processing system in accordance with the present invention is capable of operating in both a manual compression mode and an auto compression mode. The mode changeover is instructed by the changeover switch 34. When the mode changeover switch is set to the manual compression mode, a selection from three kinds of compression factors (i.e., low compression factor L, medium compression factor M, and high compression factor H) is made according to whether the compression factor selection switches 36a and 36b are ON or OFF. When the mode changeover switch 34 is in the auto compression mode, the compression factor is selected based upon the output signals from the compression factor selection unit 32, and the selected compression factor is displayed by the display unit 38.

With reference to FIGS. 1 and 2, the operation of a camera in accordance with the preferred embodiment of the present invention will now be described. A release button (not shown) is half-depressed causing preparatory actions for photography to begin. During the preparatory actions for photography, light from a photographic subject is imaged on the imaging elements of the imaging unit 14 via the lens 10 and the stop 12. The light is photoelectrically converted into analog electrical image signals by the imaging unit 14, and the analog image signals are input to the signal processing unit 16 where γ correction and like processing are performed. Next, when the release button is fully depressed after having been half-depressed, the analog image signals from the signal processing unit 16 are A/D converted by the A/D converter 18, and temporarily stored in the buffer memory 20. The brightness signals of the image signals output from the signal processing unit 16 are input to the high pass filter 28 which passes only the signals having frequency components above K MHz, where K may be, for example, 4 MHz. The integrator 30 receives the brightness signals which have passed the high pass filter 28, and integrates these signals for every image plane frame during a predetermined time period. The output of the integrator 30 is a voltage value. The comparators 40a and 40b of the compression factor selection unit 32 determine the greater relative magnitude of the output voltage $V_Y$ from the integrator 30 and the standard voltages A(V) and B(V) generated by the standard voltage generators 42a and 42b, respectively. The results of the comparison by the comparators 40a and 40b are output to the input ports $P_1$ and $P_0$, respectively, of the data compression processing unit 22.

As described above, the data compression processing unit 22, when set to the auto compression mode by the changeover switch 34, performs data compression based upon the state of the input ports $P_1$ and $P_0$. When the changeover switch 34 is set to the manual compression mode, data compression by the data compression processing unit 22 is performed according to a compression factor set by compression factor selection switches 36a and 36b. When the auto compression mode is selected, the output voltage $V_Y$ from the integrator 30, the state of the input ports $P_1$ and $P_0$, and the relationship between the selected compression factors are as shown below in Table 1.

TABLE 1

| Integrator Output Voltage $V_Y$ | State of Input Ports ($P_1/P_0$) | Selected Data Compression Factor |
| --- | --- | --- |
| $V_Y \geq A(V)$ | H/H | L (low compression factor) |
| $A(V) \geq V_Y \geq B(V)$ | L/H | M (medium compression factor) |
| $V_Y \leq B(V)$ | L/L | H (high compression factor) |

As seen in Table 1, the selected compression factor becomes lower to the extent that the output voltage $V_Y$ of the integrator 30 becomes higher due to a greater number of high frequency components in the brightness signal of the analog image data. Since an image with a large number of high frequency components is a detailed image, it is necessary to take a low data compression factor in comparison with a picture having a small number of high frequency components, such as a monotonous picture.

Upon full depression of the release button, the digital image data temporarily stored in the buffer memory 20 are output to the data compression unit 22 which performs image data compression based upon the selected compression factor. A single frame sequence ends with the recording of the compressed image data on the memory card 24.

Therefore, in accordance with the present invention, a data compression factor is automatically selected for performing data compression by the data compression unit 22 based upon the high frequency components of the brightness signals of analog image data output from the signal processing unit 16. Accordingly, the time from the commencement of a photographic action until storage of image data on the memory card 24 can be shortened in comparison to prior art imaging systems where data compression is performed based upon the properties of the digital image data, or based upon a data compression processing unit extracting partial image data, and high speed continuous photography becomes possible. Furthermore, since it is not necessary to actuate the A/D converter 18, buffer memory 20 and data compression processing unit 22 for the selection of the compression factor, no waste of electric power takes place.

Although the image processing system according to the preferred embodiments has been described with respect to using the high frequency components of the brightness signals as an index for data compression factor selection, the invention is not limited in this manner, and the analog image signals themselves may be used for compression factor selection, or various signals comprising the analog image signals may be used.

For example, the color component signals (R signal, G signal, B signal) of the three primary colors (red, green and blue, respectively) may be used for compression factor selection. In this regard, color component signals from the imaging unit 14 are analyzed and output, and the G signal may be input to the high pass filter 28. It is understood from the known equation $$E_Y = 0.30\ E_R + 0.59\ E_G + 0.11\ E_B, \qquad (1)$$

where $E_Y$ is the brightness signal value and $E_R$, $E_G$, $E_B$ are values of the R signal, G signal, and B signal, respectively, that the G signal is the largest component constituting the brightness signal value. If the compression factor is selected based on the value of the G signal, results are obtained which are similar to those obtained if the compression factor is selected based on the brightness signal. Thus, the invention is not limited to using high frequency components of the analog image signal for selection of the compression factor, and the compression factor may be selected based upon optional frequency components.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A system for selecting a data compression factor, comprising:

an image processing unit photoelectrically converting light from a photographic subject to analog image signals and performing image processing on the analog image signals;

a frequency component extraction unit, operatively coupled to the image processing unit, receiving the processed analog image signals from the image processing unit and extracting frequency components from the analog image signals;

a compression factor selection unit, operatively coupled to the frequency component extraction unit, selecting a compression factor based upon the frequency components of the analog image signals extracted by the frequency component extraction unit; and a data compression unit, operatively coupled to the image processing unit, receiving processed analog image signals from the image processing unit, converting the processed analog image signals to digital image signals and compressing the digital image signals based on the selected compression factor.

2. The data compression factor selection system, as recited in claim 1, wherein the frequency component extraction unit extracts high frequency components from the received analog image signals.

3. The image processing system, as recited in claim 1, wherein the signals received by the frequency component extraction unit include brightness signals from the image processing unit, and the frequency component extraction unit extracts frequency components of the brightness signals.

4. A system for selecting a data compression factor, comprising:

an image processing unit photoelectrically converting light from a photographic subject to analog image signals and performing image processing on the analog image signals;

a frequency component extraction unit, operatively coupled to the image processing unit, receiving the processed analog image signals from the image processing unit and extracting frequency components from the analog image signals; and a compression factor selection unit, operatively coupled to the frequency component extraction unit, selecting a compression factor based upon the frequency components of the analog image signals extracted by the frequency component extraction unit, wherein the image processing unit color analyzes the light from the photographic subject and outputs analog image signals which are component signals of the three primary colors, and the signals received by the frequency component extraction unit include component signals of the three primary colors and the frequency component extraction unit extracts frequency components of a green color component signal.

5. A system for selecting a data compression factor, comprising:

an image processing unit photoelectrically converting light from a photographic subject to analog image signals and performing image processing on the analog image signals;

a frequency component extraction unit, operatively coupled to the image processing unit, receiving the processed analog image signals from the image processing unit and extracting frequency components from the analog image signals; and a compression factor selection unit, operatively coupled to the frequency component extraction unit, selecting a compression factor based upon the frequency components of the analog image signals extracted by the frequency component extraction unit wherein the frequency component extraction unit comprises a high pass filter receiving the processed analog image signals and passing only certain frequency components of the analog image signals, and an integrator receiving output signals passed from the high pass filter, integrating the output signals from the high pass filter during a predetermined time interval and outputting a voltage value.

6. The image processing system, as recited in claim 5, wherein the compression factor selection unit comprises:

a first comparator to which the output of the integrator and a first standard voltage are input; and a second comparator to which the output of the integrator and a second standard voltage are input.

7. A system for automatically selecting a data compression factor, comprising:

an image processing unit photoelectrically converting light from a photographic subject to analog image signals and processing the analog image signals;

a frequency component extraction unit receiving the processed analog image signals from the image processing unit and extracting frequency components from the analog image signals;

an automatic data compression factor selection unit receiving the analog image signals output from the image processing unit and automatically selecting a data compression factor based upon the extracted frequency components of the analog image signals; and a data compression unit receiving processed analog image signals from the image processing unit, converting the processed analog image signals to digital image signals and compressing the digital image signals based on the selected compression factor.

8. The system for automatically selecting a data compression factor, as recited in claim 7, wherein the automatic data compression factor selection unit selects a data compression factor based upon high frequency components of the received analog image signals.

9. The system for automatically selecting a data compression factor, as recited in claim 7, wherein the analog image signals received by the selection unit include brightness signals and the automatic data compression factor selection unit selects a data compression factor based upon the brightness signals.

10. A system for automatically selecting a data compression factor, comprising:

an image processing unit photoelectrically converting light from a photographic subject to analog image signals and processing the analog image signals;

an automatic data compression factor selection unit receiving the analog image signals output from the image processing unit and automatically selecting a data compression factor based upon frequency components of the analog image signals;

an analog-to-digital converter receiving the analog image signals output from the image processing unit and converting the analog image signals to digital image signals;

a buffer memory receiving the digital image signals from the analog-to-digital converter and temporarily storing the digital image signals; and a data compression unit receiving the digital image signals output from the buffer memory and performing data compression processing on the digital image signals in accordance with the compression factor selected by the automatic data compression factor selection unit.

11. An image processing system, comprising:

an imaging unit to photoelectrically convert light from a photographic subject to analog image signals;

a signal processing unit which receives the analog image signals from the imaging unit and which performs image processing on the analog image signals;

an analog-to-digital converter which receives the analog image signals output from the signal processing unit and which converts the analog image signals to digital image data;

a buffer memory which receives the digital image data output from the analog-to-digital converter and temporarily stores the digital image data;

an automatic data compression factor selection unit which receives the analog image signals output from the signal processing unit and which automatically selects a data compression factor based upon frequency components of the analog image signals;

a data compression processing unit for performing data compression on the digital image data stored in the buffer memory in accordance with the data compression factor selected by the automatic data compression factor selection unit; and a memory unit for storing an output of the data compression processing unit.

12. An automatic data compression factor selection system, comprising:

a high pass filter which receives analog image signals and passes selected frequency components of the analog image signals;

an integrator which receives the signals passed from the high pass filter and integrates the passed signals;

a first comparator which receives as inputs the output of the integrator and a first standard voltage and outputs a first signal indicating a data compression factor; and a second comparator which receives as inputs the output of the integrator and a second standard voltage which is greater than the first standard voltage, and outputs a second signal indicating a data compression factor.

13. A method for setting a data compression factor to compress image data, comprising:

converting the image data to an analog image signal;

extracting frequency components from the analog image signal;

setting a compression factor based upon the extracted frequency components of the analog image signal;

converting the analog image signal to a digital signal; and compressing the digital signal in accordance with the set compression factor.

14. A method as recited in claim 13, wherein setting the compression factor comprises:

extracting high frequency components of the analog image signal, and setting the compression factor based on the extracted high frequency components.

15. A method as recited in claim 13, wherein the analog image signal includes a brightness signal, and setting the compression factor comprises:

extracting frequency components of the brightness signal of the analog image signal, and setting the compression factor based on the extracted frequency components of the brightness signal.

16. A method as recited in claim 13, wherein converting the image data comprises:

color analyzing the analog image signal into three primary colors, and outputting the three primary colors; and setting the compression factor comprises:
extracting the frequency components of a green component signal of the analog image signal, and
setting the compression factor based on the extracted frequency components.

17. A system for automatically selecting a data compression factor, comprising:

an image processing unit photoelectrically converting light from a photographic subject to analog image signals and processing the analog image signals;

an automatic data compression factor selection unit receiving the analog image signals output from the image processing unit and automatically selecting a data compression factor based upon high frequency components of the received analog image signals; and a data compression unit receiving processed analog image signals from the image processing unit, converting the processed analog image signals to digital image signals and compressing the digital image signals based on the selected compression factor.

18. A method for automatically setting a data compression factor to compress optical image data processed by a photographic imaging unit based on the compression factor, comprising the steps of:

converting the optical image data to an analog image signal in response to a first signal driving the photographic imaging unit;

extracting frequency components of the analog image signal output from the photographic imaging unit;

setting the compression factor based on the extracted frequency components of the analog image signal;

converting the analog image signal to a digital signal in response to a second signal originating later than the first signal; and compressing the digital signal in conformity with the set compression factor.

19. A method for automatically setting a data compression factor to compress optical image data processed by a photographic imaging unit based on the compression factor, comprising the steps of:

converting the optical image data to analog image signal in response to a first signal driving the photographic imaging unit;

color analyzing the analog image signal into three primary colors, and outputting the three primary colors;

extracting the frequency components of a green component signal of the analog image signal output from the photographic imaging unit;

setting the compression actor based on the extracted frequency components;

converting the analog image signal to a digital signal in response to a second signal originating later than the first signal; and compressing the digital signal in conformity with the set compression factor.

* * * * *

UNITED STATES PATENT AND TRADEMARK OFFICE
CERTIFICATE OF CORRECTION

PATENT NO. : 5,467,129
DATED : November 14, 1995
INVENTOR(S) : Masahiro SUZUKI

It is certified that error appears in the above-indentified patent and that said Letters Patent is hereby corrected as shown below:

Column 10, line 42, change "actor" to --factor--.

Signed and Sealed this

Second Day of April, 1996

Attest:

BRUCE LEHMAN

*Attesting Officer*       *Commissioner of Patents and Trademarks*